_United States Patent Office_

3,448,173
Patented June 3, 1969

3,448,173
ACRYLIC MODIFIERS WHICH IMPART IMPACT RESISTANCE AND TRANSPARENCY TO VINYL CHLORIDE POLYMERS
Charles Francis Ryan, Warminster, and Raymond John Grochowski, Feasterville, Pa., assignors to Rohm & Haas Company, Philadelphia, Pa., a corporation of Delaware
No Drawing. Continuation-in-part of application Ser. No. 482,603, Aug. 25, 1965. This application Feb. 18, 1966, Ser. No. 528,406
Int. Cl. C08f *29/24, 7/02, 3/68*
U.S. Cl. 260—876                 14 Claims

ABSTRACT OF THE DISCLOSURE

This invention relates to solid, thermoplastic polymeric products resulting from the sequential polymerization of (1) alkyl or alkoxyethyl esters of acrylic acid, (2) styrene or ring substituted styrenes and (3) lower alkyl esters of methacrylic acid. It also relates to high-impact-resistant and transparent materials which result from blending such products with other polymeric materials, particularly homopolymers and copolymers of vinyl chloride. The copolymers which are used in such blends typically comprise at least 80% by weight of a polyvinyl halide with up to 20% by weight of another monovinylidene compound copolymerizable therewith, such as vinyl acetate, methyl methacrylate, styrene, or the like.

---

This application is a continuation-in-part of our earlier and copending application, Ser. No. 482,603, filed Aug. 25, 1965.

Rigid and semi-rigid or lightly plasticized vinyl products and compositions have had an impressive growth in the plastics industry during the last few years. In part at least, this growth has been facilitated by the advent and commercialization of modifiers for vinyl chloride resins which have the ability to improve processing characteristics, increase impact strength and develop other useful utilities in the basic vinyl chloride resin system. Typically, these modifiers are based on an elastomeric copolymer with unsaturation, such as a butadiene-styrene copolymer. Such modifiers, while helpful and useful in many respects, do not stand up well to outdoor exposure and also cause an appreciable drop in the transparency of the unmodified vinyl resin system.

It is an object of this invention to provide an acrylic modifier capable of imparting improved impact resistance to homopolymers and copolymers of vinyl halides, particularly homopolymers and copolymers of vinyl chloride.

Another object of the invention is to enhance transparency of vinyl chloride polymers by blending with the modifiers of this invention.

It is a further object of this invention to provide polymeric vinyl compositions containing the acrylic modifiers with increased stability to light and heat.

Other objects and advantages of the invention will be apparent from the following detailed descriptions thereof.

The objects of this invention are achieved by carefully controlled polymerization carried out in emulsion. In the first step or first stage, a rubbery, crosslinked copolymer is formed by emulsion copolymerizing an alkyl ester or an alkoxyethyl ester of acrylic acid with a small amount of a crosslinking monomer. This takes place with the aid of about one to three percent by weight of a suitable emulsifier and an initiating system, preferably redox in nature. The copolymerization is conducted under such reaction conditions as to form a small particle size latex. Then, as a second step or second stage, and in the presence of the preformed latex, there is polymerized a vinyl aromatic compound, such as styrene containing a small amount of a crosslinking monomer preferably divinylbenzene, under conditions such that the crosslinked polystyrene chains become intimately entangled with or attached to the poly(alkyl acrylate) or poly(alkoxyethyl acrylate) crosslinked chains (from the first stage). During the second stage, additional initiator may be added, but no additional emulsifier is used, so that essentially no new, additional and distinct particles are produced. Preferably, the vinyl aromatic compound such as styrene, used in the second stage, is added gradually. After completion of the second stage polymerization, a lower alkyl methacrylate is added and polymerized in the presence of the two-stage latex. Again, no additional emulsifier is used, so that essentially no new additional and distinct particles are formed. More initiator may be used, however, if desired. The resultant solid, thermoplastic, polymeric product may be isolated from the emulsion by evaporation, by suitable coagulation and washing, such as by salt coagulation, freezing, etc., or it may be isolated as by spray drying. In general terms, the physical make-up of the polymeric particles produced by the three-stage emulsion polymerization technique described above may be visualized as that consisting of (1) a crosslinked rubbery polyacrylate, such as for example poly(butyl acrylate) or poly(methoxyethyl acrylate) and contained within or intertwined with this rubbery mass, (2) a crosslinked vinyl aromatic compound such as, for example, crosslinked polystyrene, and (3) surrounding the rubbery mass (1) and (2) and in intimate contact therewith a hard, substantially continuous, layer or cover of a poly(alkyl methacrylate) such as, for example, poly(methyl methacrylate). The nature and proportion of the reactants, the physical make-up or morphology of the polymeric particles and the polymerization techniques used all combine to produce a product which has the desired properties, particularly the impact resistance and light transmission properties, as will be demonstrated more fully hereinafter.

With further reference to the first stage reactants, the alkyl group in the alkyl ester of acrylic acid generally contains 3–8 carbon atoms; in the case of the alkoxyethyl ester, the alkoxy group generally contains 1–8 carbon atoms. The alkyl or alkoxy group can be a straight or branched chain. Preferred alkyl acrylates are butyl acrylate and 2-ethylhexyl acrylate. Polymers formed in the first stage must have a glass transition temperature of −30° C. or below (e.g., −35° C., −40° C., etc.). Part of the alkyl or alkoxyethyl acrylate, up to a maximum of about 20% by weight, can be replaced with a non-crosslinking (with respect to the alkyl acrylate or alkoxyethyl acrylate) monovinylidene monomer interpolymerizable therewith. Examples of vinylidene monomers interpolymerizable or copolymerizable with the acrylate monomer are vinylidene chloride, vinyl chloride, acrylonitrile, vinyl esters, alkyl methacrylic esters, methacrylic and acrylic acids, styrene, and the like. A crosslinking di- or polyfunctional monomer must be used in the first stage for crosslinking the acrylate monomer. The presence and level of crosslinking monomer is critical to the successful result of the present invention; the range of 0.1 to 5% by weight based on the alkyl acrylate or alkoxyethyl acrylate is satisfactory, with 0.5 to 1.5% by weight being preferred. Suitable crosslinking monomers include divinylbenzene, divinyl esters of di- or tri-basic acids (such as divinyl adipate), diallyl esters of polyfunctional acids (such as diallyl phthalate), divinyl ethers of polyhydric alcohols (divinyl ether of ethylene glycol), and di- and tri-methacrylic and acrylic esters of polyhydric alcohols. Particularly preferred are the commercially available diand tri-methacrylic and acrylic esters of polyhydric alcohols, since they are effective crosslinkers for acrylic esters, and impart better heat stability to the final blend. Suitable examples are ethylene glycol dimethacrylate, propylene glycol dimethacrylate, 1,3-butylene glycol dimethacrylate, 1,4-butylene glycol dimethacrylate, and the corresponding diacrylates.

With further reference to the second stage reactants, the vinyl aromatic compound is one which is readily polymerizable in emulsion by free radical techniques. Styrene is preferred, but ring-substituted styrenes such as vinyl toluene, p-isopropylstyrene, 3,4-dimethylstyrene, etc., as well as halogen-substituted derivatives such as p-bromostyrene, 3,4-dichlorostyrene, etc. can also be used. Part of the styrene (or ring-substituted styrene), up to a maximum of about 20% by weight, can be replaced with a non-crosslinking (with respect to the styrene) monovinylidene monomer interpolymerizable therewith.

Examples of vinylidene monomers interpolymerizable or copolymerizable with the styrene are vinylidene chloride, vinyl chloride, acrylonitrile, vinyl esters, alkyl methacrylic esters, methacrylic and acrylic acids, acrylic acid esters, etc. A crosslinking, bi- or polyfunctional monomer must be used in the second stage to crosslink the styrene or similar material. The presence and level of crosslinking monomer are critical to the success of the present invention; the range of 0.1% to 5.0% by weight based on the styrene is satisfactory, with 0.2% to 1.0% by weight being preferred. For optimum clarity, divinyl benzene is the crosslinker of choice; other crosslinkers that can be used include divinyl esters of di- or tribasic acids (such as divinyl adipate), dialkyl esters of polyfunctional acids (such as dialkyl phthalate), divinyl ethers of polyhydric alcohols such as the divinyl ether of ethylene glycol, and di- and tri- methacrylic and acrylic esters of polyhydric alcohols; for example, ethylene glycol dimethacrylate, propylene glycol dimethacrylate, 1,3-butylene glycol dimethacrylate, 1,4-butylene glycol dimethacrylate, etc. In polymerizing the vinyl aromatic compound in the presence of preformed latex from the first stage polymerization, it is essential that new additional and distinct particles be avoided, such as would occur if the vinyl aromatic compound polymerized by itself. This can be accomplished by keeping an insufficient supply of emulsifier present during the second stage polymerization. Thus, the simplest practice is to rely upon the emulsifier present from the first stage polymerization and not add any new emulsifier during the second stage. However, if any emusifier is added, the amount must not exceed that required to reach the critical micelle concentration. At such low levels of emulsifier, which will vary somewhat with, but can be readily determined for, the particular emulsifier used, the entire amount of emulsifier is concentrated on the preformed particles. The product resulting upon completion of the second stage polymerization may be conveniently termed a two-stage latex.

With further reference to the third stage reactants, a lower alkyl methacrylate is then polymerized in the presence of the two-stage latex. Again, no additional emulsifier is used, so that no new additional and distinct particles are formed. Additional initiator may be used if desired. The lower alkyl methacrylate of choice is methyl methacrylate, but generally, any lower alkyl ester of methacrylic acid in which the lower alkyl group has a value of $C_1$ to $C_4$ may be used. Preferably, the lower alkyl methacrylate monomer used is one the homopolymer or copolymer of which has a glass transition temperature of 60° C. or higher. Suitable examples, in addition to methyl methacrylate, are ethyl methacrylate, isopropyl methacrylate, sec.-butyl methacrylate, tert.-butyl methacrylate, and the like. The hard phase polymeric methacrylate comprises a cover or layer for the softer or rubbery inner mass and imparts compatibility to the product with vinyl halide polymers such as polyvinyl chloride. Part of the lower alkyl methacrylate, up to a maximum of about 20% by weight, can be replaced with a non-crosslinking monovinylidene monomer interpolymerizable therewith. Examples of vinylidene monomers interpolymerizable or copolymerizable with the lower alkyl methacrylate are vinylidene chloride, vinyl chloride, acrylonitrile, vinyl esters, alkyl acrylic esters, methacrylic and acrylic acids, styrene and the like.

Any of a variety of common emulsifiers well known in the art for emulsion polymerization of styrene, acrylates, and methacrylates can be used. A low level of emulsifier is desirable, preferably below one percent by weight based on the total weight of polymerizable monomers charged. Useful emulsifying agents include common soaps, alkylbenzenesulfonates, such as sodium dodecyl benzene sulfonate, alkylphenoxypolyethylene sulfonates, sodium lauryl sulfate, salts of long-chain amines, salts of long-chain carboxylic and sulfonic acids, etc. In general, the emulsifier should be compounds containing hydrocarbon groups of 8–22 carbon atoms coupled to highly polar solubilizing groups such as alkali metal and ammonium carboxylate groups, sulfate half ester groups and the like.

The polymerization medium in each stage or step will preferably contain a suitable oil-soluble, water-insoluble, free radical generating polymerization initiator, which is activated either thermally or by an oxidation-reduction (or redox) reaction. The preferred initiators are those which are the result of redox reactions, since they allow rapid polymerization at low reaction temperatures. Examples of suitable initiators are combinations such as cumene hydroperoxide-sodium metabisulfite, diisopropylbenzene hydroperoxide-sodium formaldehyde sulfoxylate, tertiary butyl peracetate-sodium hydrosulfite, cumene hydroperoxide-sodium formaldehyde sulfoxylate, etc. Water-soluble initiators may also be used, although less desirable; examples of such initiators or initiator combinations are sodium persulfate, potassium persulfate-sodium formaldehyde sulfoxylate, etc.

In order to achieve the objects of this invention such as enhancement of impact resistance and transparency or matching of refractive index when the acrylic modifier is used with vinyl halide resins, the relative proportions of the major constituents of the acrylic modifier should be within the range of 40 to 60 parts of the first stage alkyl or alkoxyethyl acrylate, 60 to 40 parts of the second stage vinyl aromatic compound, and 30 to 100 parts of the third stage lower alkyl methacrylate, all parts being by weight. A preferred range is 45 to 55 parts alkyl or alkoxyethyl acrylate, 55 to 45 parts styrene, and 40 to 60 parts methacrylate, all parts by weight.

Blends of the acrylic modifiers of the present invention with other polymeric materials may be prepared by techniques known in the art. Frequently, a dry blend of the modifier and other polymeric material such as polyvinyl chloride is first prepared. Intimate fusion or fluxed blends of the acrylic modifier and other polymeric material such as polyvinyl chloride can be prepared by admixing on or in conventional equipment, for example, on a heated two-roll mill, a Banbury mixer, an extruder, etc. The product can then be pelletized, if desired, for use in further molding or forming operations. On a weight basis, the useful range of blends is about one part to 50 parts of acrylic modifier per 100 parts of vinyl halide resin, with five parts to 30 parts of acrylic modifier per 100 parts of vinyl halide resin being preferred.

Convenient and customary operating conditions for preparing blends of the acrylic modifier with polyvinyl chloride and the like are 400° F. and from 5 to 15 minutes time on a two-roll mill. Milled blends can be compression molded, for example, at a temperature of about 350° F. and a pressure of 1800 p.s.i. Injection molding can take place under a variety of conditions, depending mostly on the molecular weight of the polyvinyl chloride used and the equipment employed for such purpose.

Certain processing aids, stabilizers, U.V. absorbers, etc. are often incorporated in the blends. The stabilizers, which serve to prevent the breakdown of the polyvinyl chloride, are of several different types commonly available and well known in the art. Some help to stabilize against heat-caused degradation; some against ultraviolet light, etc. Representative ultra-violet absorbers include, for example, 2(2'-hydroxy - 5' - methylphenyl)-benzotriazole, available under the trademark Tinuvin P; 2-hydroxy-4-methoxybenzophenone, available under the trademark Cyasorb UV-9, and others; representative heat and light stabilizers include, for example, dibutyltin bis-(isooctyl acetomercaptide), available under the trademark Advastab TM-180; dibutyltin bis(dodecyl mercaptide), available under the trademark Advastab TM-918; dibutyltin maleate; dibutyltin laurate-maleate; barium, cadmium phosphite, epoxide combinations, and many others. Typically, such stabilizers are based upon tin, barium or cadmium compounds, as noted above and as will be seen from the examples below. In those situations where clarity is not necessary, common pigments, coloring matter and dyes may be incorporated in the acrylic-vinyl halide systems.

The acrylic modified polyvinyl halide compositions of this invention are tough, rigid, thermoplastic, chemically resistant materials having high impact strength over a wide range of temperatures, excellent resistance to light and oxidative degradation, and excellent optical properties, such as transparency and freedom from haze (when unpigmented). They are useful in forming sheet for vacuum forming operations, molding compositions, particularly for blow-molded bottles, injection molding, extrusion molding, etc. The compositions may be formed into plastic pipe and extruded products of similar nature, into films useful as free films and for laminates or for protective layers such as in building and construction panels. Other applications include molded signs, light covers, and general lighting and architectural applications.

The invention described above is illustrated more fully by the following examples and tables. Unless otherwise noted, all parts and percentages are by weight.

Example I.—Preparation of acrylic modifiers and blends thereof with polyvinyl chloride To a suitable reaction vessel equipped with stirrer, degassing tube, thermometer, and additional funnel is charged 5500 parts deionized water, 147 parts of a 10% aqueous solution of sodium lauryl sulfate and 732.5 parts n-butyl acrylate, 7.3 parts 1,3-butylene glycol dimethacrylate, 0.7 part glacial acetic acid, and 1.83 parts diisopropylbenzene hydroperoxide (DIBHP). The temperature is adjusted to 30° C. and the pH determined to be 2–4. The solution is sparged with nitrogen entering under the surface for 60 minutes. A previously degassed solution of 1.46 parts sodium formaldehyde sulfoxylate in 50 parts of water is then added. An immediate exotherm occurs. Fifteen minutes after the peak temperature occurs, which may range from 45 to 55° C. depending upon the equipment chosen, a degassed mixture of 1.98 parts of sodium formaldehyde sulfoxylate in 20 parts water is added, followed immediately by the gradual addition over an 80–85 minute period of a degassed mixture of 793.5 parts styrene, 3.97 parts of DIBHP and 3.97 parts of divinylbenzene. After addition of this mixture, the temperature is adjusted to 50° C. and the reaction stirred for one hour. There is then added a solution of 0.076 part sodium formaldehyde sulfoxylate in 5 parts of water, followed by the gradual addition over a period of about one hour of a previously degassed mixture of 0.38 part DIBHP and 763 parts methyl methacrylate. The reaction is stirred for one-half hour after the peak temperature is reached, allowed to cool, and the polymer emulsion filtered. The acrylic modifier polymer is then isolated from its emulsion by spray drying. It can also be isolated or separated by evaporation or by coagulation.

The acrylic modifier polymer is blended with polyvinyl chloride (Diamond 450, a medium molecular weight material), stabilizers, etc., by mixing in a Waring Blendor, then milling the mixture for four minutes at 400° F. on a differential speed compounding roll, folding the mill stock and compression molding into test specimens at a two-minute pre-heat at 360° F., one minute at 50–60 tons' pressure. Testing is done by standard methods; total light transmission and haze are determined on 0.065" thick sheet.

The blends are prepared from polyvinyl chloride, 100–X parts, modifier X parts (where X is 10, 15 or 20), 2 parts Advawax 140 (trademark for a fatty acid ester processing lubricant), 0.5 part Hostawax OP (trademark for a stearic acid processing lubricant), and two parts Advastab TM-180 (trademark for a liquid organotin mercaptide stabilizer). The results are shown in Table I below.

TABLE I

| Modifier, X parts (from above) | Light Transmission [1] | | Izod Notched Impact, ft./lb./in.[2] | | |
|---|---|---|---|---|---|
| | Percent Total | Percent Scatter [3] | 73° F. | 50° F. | 32° F. |
| 10 | 82 | 8 | 21.2 | 1.4 | 0.8 |
| 15 | 83 | 8 | 23.6 | 9.2 | 1.8 |
| 20 | 83 | 8 | 23.5 | 13.5 | 2.3 |
| None | 85 | 4 | 0.7 | 0.5 | 0.4 |

[1] Light transmission determinations made in accordance with ASTM D 1003 (Haze and luminous transmission of transparent plastics).
[2] Izod impact determined according to ASTM D 256-56.
[3] Haze.

Example II.—Comparison of non-crosslinked and crosslinked modifiers

Example I is repeated except for the following: twenty parts of the acrylic modifier are blended with each 80 parts of polyvinyl chloride; the amount of crosslinking agent employed in the second stage (styrene) polymerization is varied from 0 to 5%; in one instance, (II–A), no crosslinking agent is used in the first-stage (butyl acrylate) polymerization. In all other instances, II–B to II–G, the crosslinker for the first stage is the same as in Example I and the crosslinker for the second stage is varied according to the tabulation shown in Table II.

TABLE II

| Acrylic Modifier Code | Divinyl-benzene, percent | Light Transmission | | Izod Impact, ft./lb./in. | |
|---|---|---|---|---|---|
| | | Percent Total | Percent Scatter [1] | 73° F. | 50° F. |
| II–A | [2] 0 | 57 | 27 | 17.9 | 3.7 |
| II–B | 0 | 56 | 27 | 20.2 | 12.4 |
| II–C | 0.2 | 81 | 7 | 25.1 | 10.0 |
| II–D | 0.5 | 85 | 7 | 23.6 | 13.1 |
| II–E | 1.0 | 83 | 6 | 22.8 | 4.9 |
| II–F | 2.0 | 83 | 6 | 23.0 | 3.8 |
| II–G | 5.0 | 83 | 5 | 24.0 | 1.4 |

[1] Haze.
[2] No butylene glycol dimethacrylate crosslinker in butyl acrylate.

Example III.—Particle-size variation of first stage acrylate latex

The particle size of the first stage latex can be varied over a fairly wide range, depending upon such factors as the nature of the acrylic ester used, the crosslinker, etc., but in general and for best results, the particle size radius should be in the range of about 200–800 A. Decreasing particle size tends to increase light transmission properties without substantial change in impact properties. In obtaining the results tabulated in Table III below, Example I is repeated except that the particle size of the first stage acrylate latex is varied by adjusting the concentration of the initiator-redox system from 0.2% by weight of sodium formaldehyde sulfoxylate (based on the weight of the butyl acrylate as in Example I) to 0.02% by weight on the butyl acrylate. The particle size radius in Angstrom (A) is determined by a soap titration method, see, for example, the method described in Brodnyan and Brown, "J. Colloid Sci.," 15, 76 (1960). As in Example II, 20 parts of the acrylic modifier are blended with each 80 parts of polyvinyl chloride.

TABLE III

| Acrylic Modifier Code | Percent SFS [1] | Particle Radius | Light Transmission | | Izod Impact, ft./lb./in. | |
|---|---|---|---|---|---|---|
| | | | Percent Total | Percent Scatter [2] | 73° F. | 50° F. |
| III-A | 0.2 | 280 | 84 | 6 | 22.9 | 14.4 |
| III-B | 0.05 | 445 | 82 | 8 | 23.6 | 13.6 |
| III-C | 0.02 | 500 | 75 | 14 | 24.2 | 15.9 |

[1] SFS is abbreviation for sodium formaldehyde sulfoxylate.
[2] Haze.

Example IV.—Effect of varying ratio of second stage vinyl aromatic compound to first stage acrylate In Example I the ratio of butyl acrylate to styrene is 48 parts of butyl acrylate to 52 parts of styrene. A series of modifiers is prepared according to the teachings of Example I, except that (a) the ratio of butyl acrylate to styrene is varied, (b) the amounts of divinylbenzene and diisopropyl hydroperoxide are also varied but the relative amount of each to the styrene is maintained at the same ratio or level as in Example I. The results are tabulated in Table IV. (Twenty parts of the acrylic modifier are blended with each 80 parts of polyvinyl chloride, as in Example II.)

TABLE IV

| Acrylic Modifier Code | Parts B.A. | Parts Styrene | Light Transmission | | Izod Impact | |
|---|---|---|---|---|---|---|
| | | | Percent Total | Percent Scatter [1] | 73° F. | 50° F. |
| IV-A | 30 | 70 | 67 | 13 | 20.3 | 1.0 |
| IV-B | 40 | 60 | 83 | 4 | 23.7 | 7.8 |
| IV-C | 44 | 56 | 86 | 4 | 22.0 | 1.2 |
| IV-D | 46 | 54 | 85 | 5 | 23.2 | 4.0 |
| IV-E | 48 | 52 | 85 | 7 | 23.6 | 13.1 |
| IV-F | 50 | 50 | 83 | 6 | 24.2 | 4.2 |
| IV-G | 52 | 48 | 82 | 8 | 24.4 | 11.0 |
| IV-H | 55 | 45 | 75 | 13 | 25.5 | 13.9 |
| IV-I | 65 | 35 | 61 | 25 | 25.1 | 21.3 |

[1] Haze.

Examination of Table IV illustrates that a desirable ratio of the first stage alkyl acrylate, e.g., butyl acrylate, to the second stage vinyl aromatic compound (e.g., styrene) is from about 40 to 55 parts of alkyl acrylate with, correspondingly, about 60 to 45 parts of vinyl aromatic. Within these ranges, the refractive index of the acrylic modifier and the vinyl halide polymer (e.g., polyvinyl chloride) are essentially matched. However, and quite surprisingly, in order to achieve the desired objectives, such as good light transmission properties and good impact properties, merely using the polymerizable reactants in proper proportions will not yield the significant and improved results of the present invention. The manner in which the correctly proportioned, polymerizable reactants are, so to speak, put together, the factors of sequential polymerization, avoidance of new particles, crosslinkers, etc., all combine to give the improved results as is apparent from the following:

A series of acrylic modified polyvinyl chloride compositions is prepared.

TABLE V

A. Formulation

| | Parts by weight |
|---|---|
| Polyvinyl Chloride | 160 |
| Acrylic Modifier | 40 |
| Processing Lubricant | 4 |
| Stearic Acid Lubricant | 1 |
| Organo-tin Stabilizer | 4 |

B. Processing

All stocks are dry blended (premixed) in a Waring Blendor, then milled for four minutes on a two-roll mill at 400° F. roll temperature, compression molded at 360° F. and cooled in a separate press. Izod impact tests are run on ⅛" thick notched specimens at 75° F., 60° F., 50° F., and 40° F. Total light transmission and percent scatter are measured on 0.065" sheet. Results of testing compositions prepared in accordance with the formulation of Table V are recorded in Table VI below.

TABLE VI

| Acrylic Modifier Code | Description of Modifier | Light Transmission | | Izod Notched Impact, ft./lb./in. | | | |
|---|---|---|---|---|---|---|---|
| | | Percent Total | Percent Scatter [1] | 75° F. | 60° F. | 50° F. | 40° F. |
| VI-A | Blend of crosslinked poly-(n-butyl acrylate) latex [2] and crosslinked polystyrene latex.[3] | 24 | 24 | 0.6 | | | |
| VI-B | Interpolymer of n-butyl acrylate and styrene | 80 | 20 | 18.9 | 2.1 | 1.8 | 1.2 |
| VI-C | Methyl methacrylate polymerized on latex blend of VI-A. | 44 | 31 | 17.0 | 10.0 | 9.5 | 1.5 |
| VI-D | Sequential terpolymer precipitated in accordance with teachings of Example I. | 82 | 7 | 24.7 | 20.2 | 12.9 | 3.6 |
| VI-E | Methyl methacrylate polymerized on copolymer of n-butyl acrylate and styrene. | 85 | 4 | 1.5 | | | |

[1] Haze.
[2,3] All modifiers are emulsion polymerized and contain 48 parts of n-butyl acrylate and 52 parts of styrene with 1% by weight of 1,3-butylene glycol dimethacrylate crosslinking agent based on the butyl acrylate and 0.5% by weight of divinyl benzene crosslinking agent based on the styrene. Modifiers VI-C and VI-E contain 50 parts of methyl methacrylate in addition to the aforementioned amounts of butyl acrylate and styrene.

It is apparent from Table VI that a blend of poly(n-butyl acrylate) and polystyrene latices when employed as modifier (VI-A) is defective in both light transmission properties and impact properties; that (VI-B) interpolymers of n-butyl acrylate and styrene are defective in lower temperature impact. Modifier VI-C, which is prepared by polymerizing methyl methacrylate in the presence of a mixture of latices of VI-A, is defective in light transmission properties, while VI-E, prepared by polymerizing methyl methacrylate on a copolymer of butyl acrylate and styrene is deficient in impact strength even at higher temperatures.

Example V (a) To a suitable reaction vessel equipped with stirrer, degassing tube, thermometer, and addition funnel are charged 5500 parts deionized water, 147 parts of a 10% solution of sodium lauryl sulfate and 732.5 parts n-butyl acrylate, 7.3 parts 1,3-butylene glycol diacrylate, 0.7 part glacial acetic acid, and 1.83 parts diisopropylbenzene hydroperoxide (DIBHP). The temperature is adjusted to 30° C. and the pH determined to be 2-4. The solution is sparged with nitrogen entering under the surface for 60 minutes. A previously degassed solution of 0.146 part sodium formaldehyde sulfoxylate in 5 parts of water is then added. An immediate exotherm occurs. Fifteen minutes after the peak temperature occurs, which may range from 45 to 55° C. depending upon the equipment chosen, a degassed mixture of 1.98 parts of sodium formaldehyde sulfoxylate in 20 parts water is added, followed immediately by the gradual addition over an 80-85 minute period of a degassed mixture of 793.5 parts styrene, 3.97 parts DIBHP and 3.97 parts of divinylbenzene. After addition of this mixture, the temperature is adjusted to 50° C. and the reaction stirred for one hour. There is then added a solution of 0.076 part of sodium formaldehyde sulfoxylate in 5 parts of water, followed by the gradual addition over a period of about one hour of a previously degassed mixture of 0.38 part DIBHP and 763 parts methyl methacrylate. The reaction is stirred for one half hour after the temperature is reached, allowed to cool, and the polymer emulsion filtered. The polymer is then isolated from its emulsion by spray-drying. It can also be isolated by evaporation, or by coagulation.

(b) Example V(a) is repeated except that allyl methacrylate is substituted for the 1,3-butylene glycol diacrylate as the polyfunctional crosslinking monomer in the first stage polymerization.

(c) Example V(a) is repeated except that divinylbenzene is substituted for the 1,3-butylene glycol diacrylate as the polyfunctional crosslinking monomer in the first stage polymerization.

(d) Example V(a) is repeated except that diallyl phthalate is substituted for the 1,3-butylene glycol diacrylate as the polyfunctional crosslinking monomer in the first stage polymerization.

(e) Example V(a) is repeated, except that 1,3-butylene glycol dimethacrylate is substituted for the 1,3-butylene glycol diacrylate in the first stage polymerization, and 1,3-butylene glycol dimethacrylate is substituted for the divinylbenzene in the second stage polymerization.

(f) Example V(e) is repeated, except that 1,3-butylene glycol diacrylate is substituted for the 1,3-butylene glycol dimethacrylate in the second stage polymerization.

Stabilized polyvinyl chloride compositions containing the modifiers of Examples V(a)–V(e) at the level of 25 parts of modifier per 100 parts of polyvinyl chloride display the following light transmission and impact performance properties:

TABLE VII

| Modifier | Light Transmission | | Izod Notched Impact, ft./lb./in. | | |
|---|---|---|---|---|---|
| | Percent Total | Percent Scatter [1] | (R.T.) 73° F. | 60° F. | 50° F. |
| V(a) | 71 | 17 | 21.0 | 12.4 | 4.3 |
| V(b) | 70 | 15 | 24.3 | 1.6 | 1.0 |
| V(c) | 82 | 7 | 22.7 | 17.9 | 8.9 |
| V(d) | 82 | 8 | 24.2 | 14.3 | 6.5 |
| V(e) | 66 | 19 | 24.4 | 17.1 | 14.7 |
| V(f) | 73 | 15 | 25.0 | 19.9 | 17.6 |

[1] Haze.

Example VI (a) To a suitable reaction vessel equipped with stirrer, degassing tube, thermometer, and addition funnel are charged 5500 parts deionized water, 147 parts of a 10% solution of sodium lauryl sulfate and 732.5 parts 2-methoxyethyl acrylate, 7.3 parts 1,3-butylene glycol dimethacrylate, 0.7 part glacial acetic acid, and 1.83 parts diisopropylbenzene hydroperoxide (DIBHP). The temperature is adjusted to 30° C. and the pH determined to be 2–4. The solution is sparged with nitrogen entering under the surface for 60 minutes. A previously degassed solution of 0.146 part sodium formaldehyde sulfoxylate in 5 parts of water is then added. An immediate exotherm occurs. Fifteen minutes after the peak temperature occurs, which may range from 45 to 55° C. depending upon the equipment chosen, a degassed mixture of 1.98 parts of sodium formaldehyde sulfoxylate in 20 parts water is added, followed immediately by the gradual addition over an 80–85-minute period of a degassed mixture of 793.5 parts styrene, 3.97 parts DIBHP and 3.97 parts of divinylbenzene. After addition of this mixture, the temperature is adjusted to 50° C. and the reaction stirred for one hour. There is then added a solution of 0.076 part of sodium formaldehyde sulfoxylate in 5 parts of water, followed by the gradual addition over a period of about one hour of a previously degassed mixture of 0.38 part DIBHP and 763 parts methyl methacrylate. The reaction is stirred for one half hour after the temperature is reached, allowed to cool, and the polymer emulsion filtered. The polymer is then isolated from its emulsion by spray-drying.

(b) The above polymer is evaluated as a modifier for polyvinyl chloride as follows: 160 parts of polyvinyl chloride, 40 parts of the modifier (in this case, the modifier based on the first stage methoxyethyl acrylate), 4 parts of an ester-type wax (Advawax 140), and one part stearic acid lubricants and 4 parts of a liquid organo-tin mercaptide (Advastab TM-180) are blended by premixing in a Waring Blendor, milling for four minutes on a two-roll mill at 400° F., and then compression-molding at 400° F. Izod notched impact tests are run on samples cut from 1/8″ thick sheet, prepared as above, at 75° F., 60° F., and 40° F. These test results are tabulated below.

Light transmission:
  Total _____percent__ 84
  Scatter (haze) _____do____ 6.5
Izod notched impact:
  75° F. _____ 9.4
  60° F. _____ 1.7
  40° F. _____ 1.0

These results may be compared with unmodified polyvinyl chloride which has an Izod notched impact value of about 0.7 at 75° F.

(c) Analogous modifier polymers can be made by replacing the methoxyethyl acrylate in (a) above with one of the following:

ethoxyethyl acrylate
propoxyethyl acrylate
isopropoxyethyl acrylate
butoxyethyl acrylate
hexoxyethyl acrylate
2-ethylhexoxyethyl acrylate
octoxyethyl acrylate Such polymers may be incorporated in vinyl chloride homopolymers or copolymers and exhibit similar improvement in light transmission and impact properties.

Example VII

This example illustrates that part of the first stage alkyl acrylate can be replaced with a monovinylidene monomer interpolymerizable therewith; and that part of the second stage vinyl aromatic compound can be replaced with a monovinylidene monomer interpolymerizable therewith. The teachings of Example I are followed with exception that the following charge ratios are used:

First stage charge: butyl acrylate/styrene/1,3-butylene glycol dimethacrylate=660 parts/73 parts/7.3 parts.

Second stage charge: styrene/butyl acrylate/divinylbenzene=714 parts/79 parts/7.9 parts.

Third stage charge: methyl methacrylate—763 parts.

After isolation of the polymer from the emulsion by spray-drying, the acrylic modifier polymer is blended with polyvinyl chloride as in Example I in the ratio of 20 parts of the modifier for each 80 parts of polyvinyl chloride. Test results show that impact resistance of this composition at 73° F. is greater than 22 ft. lbs., and light transmission is 83% total with 5% scatter. Impact resistance at 60° F. is 17.3 ft. lbs., and at 40° F. it is 2.1 ft. lbs.

Accelerated ultraviolet light exposure tests in a 6000 watt Xenon light Weatherometer have shown that polyvinyl halide, and particularly polyvinyl chloride, blends or compositions containing the acrylic modifiers of the present invention have excellent impact retention and color/gloss durability. A stabilized polyvinyl chloride composition is modified with 20 parts by weight of the acrylic modifier of Example I for each 80 parts of polyvinyl chloride. Initial room temperature Izod notched impact strength is 22.5 ft.-lb./in. After 247 hours in the Weatherometer, the impact value is 21.2; after 499 hours the impact value is 19.2; after 1000 hours the value is 19.8; after 1500 hours the value is 19.4; at the expiration of 2000 hours the impact value is 19.9. Only a very slight change in appearance is noted in color and gloss after the expiration of the 2000 hour Weatherometer exposure. A comparison is made by substituting as the modifier, in the same stabilized polyvinyl chloride composition as above, 20 parts of a commercially available copolymer having unsaturation (i.e., a butadiene-styrene copolymer) for each 80 parts of polyvinyl chloride. Initial Izod notched impact is 21.1 ft.-lb./in.; after 247 hours, the impact value is 22.5; after 499 hours the value is 19.2; after 1000 hours the value has dropped to 10.8; after 1500 hours the value is 10.3; at the expiration of 2000 hours the impact value is only 3.4. A very noticeable darkening of this composition is noted after the expiration of the 2000-hour Weatherometer test.

The sequential emulsion polymerizations can be carried out at temperatures ranging from about 0° C. to 90° C. with 30° C. to 70° C. being preferred. The polymerization medium may contain, in accordance with known practice, a chain transfer agent such as tertiary dodecyl mercaptan, secondary butyl mercaptan, normal dodecyl mercaptan, and the like, particularly for limiting, where desired, the molecular weight of the alkyl methacrylate phase. The free radical initiator will be used in an effective amount, which will vary depending on the monomers, the temperature and the method of addition, but generally, the quantity of initiator will vary from about 0.001 to 2% by weight in each polymerization stage based on the weight of the monomer charge, with up to a maximum of about 5% by weight based on the total weight of the monomers charged.

The sequentially emulsion polymerized acrylic modifiers of this invention may be used to advantage in modifying a wide range of vinyl halide polymers or resins. Thus, vinyl halide polymers in the low, medium and high molecular weight ranges can be used, although the improvements become more demonstrable where they are needed most, viz. in the medium and higher molecular weight vinyl halide resins, and particularly in the medium and higher molecular weight homopolymers and copolymers of vinyl chloride.

The vinyl halide resins or polymers which may be utilized in the preparation of the composition of this invention include all of the vinyl halide polymers composed predominantly of polymerized vinyl halide and preferably all of the vinyl chloride polymers composed predominantly of polymerized vinyl chloride. Thus, there may be utilized the homopolymers of the vinyl halides such as vinyl chloride and the multicomponent copolymers or interpolymers made from monomeric mixtures containing a vinyl halide and preferably vinyl chloride together with a lesser amount of other copolymerizable monoolefinic materials. Monoolefinic materials which may be interpolymerized with the vinyl chlorides include, for example, vinyl esters such as vinyl acetate, vinyl propionate, vinyl butyrate, vinyl chloroacetate, vinyl chloropropionate, vinyl benzoate, vinyl chlorobenzoate, and others; acrylic and alpha-acrylic acids, their alkyl esters and their amides, such as acrylic acid and methacrylic acid, methyl acrylate, ethyl acrylate, butyl acrylate, methyl methacrylate, ethyl methacrylate, acrylamide, N-methyl acrylamide, methacrylamide, and various other readily polymerizable compounds containing a single olefinic double bond, especially those containing the $CH_2=C<$ group. The proportions of the various monomers in the monomeric mixtures polymerized to give vinyl halide polymers and copolymers may be varied considerably as long as the vinyl halide constitutes at least 60 weight percent of the total, and more preferably, at least 80 weight percent of the total.

As used in the claims attached hereto, the term "polyfunctional crosslinking monomer" includes difunctional or bifunctional crosslinking monomers, that is, monomers containing two reactive or functional groups as well as crosslinking monomers containing more than two reactive or functional groups.

The term "sequentially emulsion polymerized" refers to polymers (which term includes copolymers as well as homopolymers) which are prepared in aqueous dispersion or emulsion and in which successive monomer charges are polymerized onto or in the presence of a preformed latex prepared from a prior monomer charge and stage. In this type of polymerization, each succeeding stage or phase is attached to and intimately associated with its preceding stage or phase or preceding stages or phases. Although the exact nature of this attachment is not known, and while it may be chemical or physical or both, the sequentially prepared polymers or copolymers of the present invention are characterized by and are made by a process in which the total particle content is substantially constant upon completion of the first stage polymerization, i.e., new additional and distinct particles are avoided after the first stage, as heretofore noted.

Polyvinyl chloride sheet stock incorporating the acrylic modifiers of the present invention can be formed into a multiplicity of useful articles by conventional techniques such as by vacuum forming, thermoforming, etc. Examples of such articles are, for instance, luggage and luggage covers, electric motor covers, vehicle protective covers, processing trays, bins and containers of all kinds; bottles, etc.

The above descriptions of the invention are set forth only by way of illustration. As will be apparent to those skilled in the art, other variations and modifications can readily be employed without departing from the spirit and scope of the invention described above and claimed below.

We claim:

1. A process for making a sequentially emulsion polymerized acrylic modifier for vinyl halide polymers comprising the steps:
   (a) forming a polymer latex by emulsion copolymerizing, in the presence of an effective amount of a free radical initiator and an emulsifying agent, a first monomer charge of 80 to 100% by weight of $(C_1-C_8)$alkoxyethyl acrylate, 20 to 0% by weight of a different monovinylidene monomer interpolymerizable therewith, and 0.1 to 5.0 weight percent, based on the weight of the alkoxyethyl acrylate, of a polyfunctional crosslinking monomer to form dispersed particles of polymer having a glass transition temperature of $-30°$ C. or lower and, after substantially completing the aforesaid copolymerization,
   (b) adding to the resulting latex a second monomer charge of 80 to 100% by weight of a vinylaromatic compound, 20 to 0% by weight of a different monovinylidene monomer interpolymerizable therewith, and 0.1 to 5.0 weight percent of a polyfunctional crosslinking monomer based on the weight of the vinylaromatic compound, and emulsion polymerizing such monomer charge in the presence of an effective amount of a free radical initiator and an amount of emulsifier which does not exceed the critical micelle concentration whereby substantially no additional dispersed polymer particles are formed, and after substantially completing the copolymerization of the second monomer charge,
   (c) adding to the resulting latex a third monomer charge of 80 to 100% by weight of $(C_1-C_4)$alkyl methacrylate and 20 to 0% of a different monovinylidene monomer interpolymerizable therewith, emulsion polymerizing said third monomer charge in the presence of an effective amount of a free radical initiator, and an amount of emulsifier which does not exceed the critical micelle concentration whereby substantially no additional dispersed polymer particles are formed.

2. The process of claim 1 in which there are used 40 to 60 parts of the first monomer charge, 60 to 40 parts of the second monomer charge, and 30 to 100 parts of the third monomer charge, all parts being on a weight basis.

3. The process of claim 2 in which the third monomer charge is a ($C_1$–$C_4$)alkyl methacrylate which when homopolymerized forms a polymer having a glass transition temperature of at least 60° C.

4. The modifier of claim 3 in which the alkoxyethyl acrylate of step (a) is 2-methoxyethyl acrylate, the vinyl aromatic compound of component (b) is styrene and the lower alkyl methacrylate of step (c) is methyl methacrylate.

5. The process of claim 4 in which in step (a) 2-methoxyethyl acrylate is copolymerized with 1,3-butylene glycol dimethacrylate, in step (b) styrene is copolymerized with divinylbenzene and in step (c) methyl methacrylate is polymerized.

6. The process of claim 5 in which in step (a) 45 to 55 parts by weight of 2-methoxyethyl acrylate is copolymerized with 0.5 to 1.5% by weight, based on the 2-methoxyethyl acrylate, of 1,3-butylene glycol dimethacrylate, in step (b) 55 to 45 parts by weight of styrene is copolymerized with 0.2 to 1.0% by weight based on the weight of styrene, of divinylbenzene, and in step (c) 40 to 60 parts by weight of methyl methacrylate is polymerized.

7. A process according to claim 6 in which the average particle size radius of the dispersed polymer particles in the latex formed in step (a) is in the range of about 200 to 800 Angstrom units.

8. The polymeric product obtained by the process of claim 1.

9. The polymeric product obtained by the process of claim 3.

10. The polymeric product obtained by the process of claim 6.

11. The polymeric product obtained by the process of claim 7.

12. A thermoplastic composition comprising a blend of
(I) a member of the class consisting of (1) a polyvinyl halide and (2) copolymers of at least 80% by weight of a vinyl halide with up to 20% by weight of an ethylenically unsaturated monomer copolymerizable therewith, and
(II) about 1–50 parts by weight of the acrylic modifier of claim 8 per 100 parts by weight of (I).

13. The composition of claim 12 in which (I) is polyvinyl chloride.

14. The composition of claim 13 in which (II) is present in the amount of 5–30 parts by weight per 100 parts by weight of (I).

References Cited
UNITED STATES PATENTS

| | | | |
|---|---|---|---|
| 3,041,306 | 6/1962 | Baer | 260—885 |
| 3,251,904 | 5/1966 | Souder et al. | 260—876 |
| 3,287,444 | 11/1966 | Ennor et al. | 260—879 |
| 3,288,886 | 11/1966 | Himel et al. | 260—876 |

SAMUEL H. BLECH, *Primary Examiner.*

JOHN T. GOOLKASIAN, *Assistant Examiner.*

U.S. Cl. X.R.

260—29.7, 881, 884, 885